United States Patent
Billaud et al.

(10) Patent No.: US 10,243,435 B2
(45) Date of Patent: Mar. 26, 2019

(54) ELECTRIC MOTOR ROTOR OPTIMIZED FOR GREAT POWERS

(71) Applicant: GE Energy Power Conversion Technology Ltd, Rugby, Warwickshire (GB)

(72) Inventors: Antoine Billaud, Floremont (FR); Thibaut Mauffrey, Annecy (FR)

(73) Assignee: GE ENERGY POWER CONVERSION TECHNOLOGY LTD, Rugby (GB)

( * ) Notice: Subject to any disclaimer, the term of this patent is extended or adjusted under 35 U.S.C. 154(b) by 247 days.

(21) Appl. No.: 15/007,356

(22) Filed: Jan. 27, 2016

(65) Prior Publication Data

US 2016/0218605 A1  Jul. 28, 2016

(30) Foreign Application Priority Data

Jan. 27, 2015  (EP) .................................... 15305088

(51) Int. Cl.
  *H02K 3/48*  (2006.01)
  *H02K 17/16*  (2006.01)

(52) U.S. Cl.
  CPC ............ *H02K 17/165* (2013.01); *H02K 3/48* (2013.01)

(58) Field of Classification Search
  CPC .............................. H02K 17/165; H02K 3/48
  USPC ........................................................ 310/211
  See application file for complete search history.

(56) References Cited

U.S. PATENT DOCUMENTS

| 5,512,792 A * | 4/1996 | Bawin ...................... H02K 1/28 310/211 |
| 2014/0246943 A1* | 9/2014 | Omekanda ................ B60L 1/00 310/211 |
| 2015/0333606 A1* | 11/2015 | Hanna ................ H02K 15/0012 310/211 |
| 2016/0204684 A1* | 7/2016 | Komatsu .............. H02K 17/165 310/211 |

FOREIGN PATENT DOCUMENTS

| DE | 1488684 A1 | 7/1969 |
| DE | 19542962 C1 | 11/1996 |
| EP | 0608675 A1 | 8/1994 |
| FR | 2950751 A1 | 4/2011 |
| WO | 2010100214 A2 | 9/2010 |

OTHER PUBLICATIONS

European Search Report and Written Opinion dated Aug. 7, 2015 which was issued in connection with EP Patent Application No. 15305088.5 which was filed on Jan. 27, 2015.
Machine Translation and First Office Action and Search issued in connection with corresponding CN Application No. 201610054100.1 dated Nov. 1, 2018.

* cited by examiner

*Primary Examiner* — Forrest M Phillips
(74) *Attorney, Agent, or Firm* — GE Global Patent Operation; Scott R. Stanley

(57) ABSTRACT

A rotor for a high-speed, high-power electric motor includes, according to the rotor axis, a magnetic mass surrounded on both sides by short-circuit rings, and crossed at several notches by electrical conductors connecting the short-circuit rings to form a squirrel cage. Each electrical conductor is formed of a single bar having a trapezoidal section over its entire length.

9 Claims, 2 Drawing Sheets

ELECTRIC MOTOR ROTOR OPTIMIZED FOR GREAT POWERS

BACKGROUND

Embodiments of the present invention relate to high-power electric motor rotors intended to operate at particularly high rotation speeds. In particular, embodiments of the present invention apply to asynchronous motors able to operate at high peripheral speeds typically from 100 m·s$^{-1}$, motors especially intended for gas and oil applications, whether on land, in sea, or even underwater.

The peripheral speed is the calculated tangential velocity at the outer diameter of the rotating rotor.

High-power electric motors able to operate at high rotation speeds have numerous applications. Manufacturing of motors meeting the growing requirements in terms of power and speed imposes new stresses, particularly mechanical, in the rotor of said motors. Patent documents EP 0 608 675 A1 and U.S. Pat. No. 5,512,792 describe particularly effective embodiments of rotors for asynchronous electric motors, operating at high power and speed. A rotor is thus described whose bars forming the squirrel cage can freely expand, thus mitigating effects due to thermal imbalances.

Nevertheless, in order to further increase the power received by this type of motor, increasing the diameter of the bars forming the squirrel cage proves to be necessary to avoid excessive heating of the latter. However, on the basis of the examples described in the patents mentioned above, increasing the sections of said bars results in reduction of distances between these same bars. This solution thus proves to be less satisfactory because the reduction of spacing between each bar introduced new magnetic and mechanical stresses, which ultimately leads to weakening of the rotor.

The patent document FR 2 950 751 proposes a rotor able to be integrated in an electric motor with improved characteristics in terms of supported power and peripheral rotation speed, particularly by its capacity to carry a larger electric power through the squirrel cage of the rotor. To do this, the rotor comprises several electrical conductors, each conductor being formed by assembly of a main bar and a secondary bar respectively having a substantially circular section and passing through the magnetic body of the rotor through a notch. The shape and arrangement of each notch are defined so as to ensure a contact between the main bar and the secondary bar sufficient to allow passage of electric current when the rotor is rotating.

However, such an assembly leads to difficulties in implementation. In particular, while the operating temperature is not stabilized, differential deformations between the main bar and the secondary bar lead, on one hand, to the existence of an unbalance and, on the other hand, to poor electrical contact between the main bar and the secondary bar.

SUMMARY OF THE INVENTION

Embodiments of the present invention thus relate to solving these problems by proposing an improved rotor.

Embodiments of the present invention particularly relate to a rotor for high speed electric motor of high power comprising, along the axis of the rotor, a magnetic mass, surrounded on both sides by short-circuit rings, and crossing in several notches by electrical conductors connecting the short-circuit rings to form a squirrel cage.

Each electrical conductor is formed of a single bar having a trapezoidal section over its entire length.

According to some embodiments, the rotor comprises one or more of the following characteristics: the section of each bar forms an isosceles trapezium; the small base, respectively the large base, of each bar is placed radially outwards relative to the rotor axis; at least the large base, respectively the small base, of each bar has two rounded corners whose rounding radius is between 10% and 50% of the length of the large base and the small base respectively; the ends of each bar are freely placed in orifices opened at the periphery of the short-circuit rings; each orifice has inner dimensions greater than those of the rod that it accommodates, so as to leave a tolerance clearance allowing free expansion of the end of said bar in the orifice; each notch in the magnetic mass has inner dimensions greater than those of the rod that it accommodates, so as to leave a tolerance clearance allowing free expansion of said bar in the notch; each bar is formed of a single material and is made of copper or copper alloy; and/or the section of each bar is substantially constant along the axis of the rotor.

Embodiments of the present invention also relate to a motor able to drive the rotor as defined above at a peripheral speed greater than or equal to 100 m·s$^{-1}$ at the outer diameter of the magnetic mass.

Embodiments of the present invention even have the advantage that they can significantly enable improvement of the power supported by motors such as those described in patent documents EP 0 608 675 and U.S. Pat. No. 5,512,792 without causing profound change in the structure of existing rotors.

Other characteristics and advantages of embodiments of the present invention appear more clearly on reading the following description, of a particular embodiment, given as illustrative and non-limiting example, and referring to the annexed figures which show:

DETAILED DESCRIPTION

The rotor according to embodiments of the present invention is applied to motors able to operate at high peripheral speeds typically from 100 m·s.$^{-1}$. The rotor according to embodiments of the invention is particularly able to be used within asynchronous electric motors, particularly for gas and oil applications, whether on land, in sea, or even underwater. Conventionally in the present application, the expression "substantially equal to" will express a relationship of equality at plus or minus 10%, more particularly a relationship of equality at plus or minus 5%.

Figure 1:
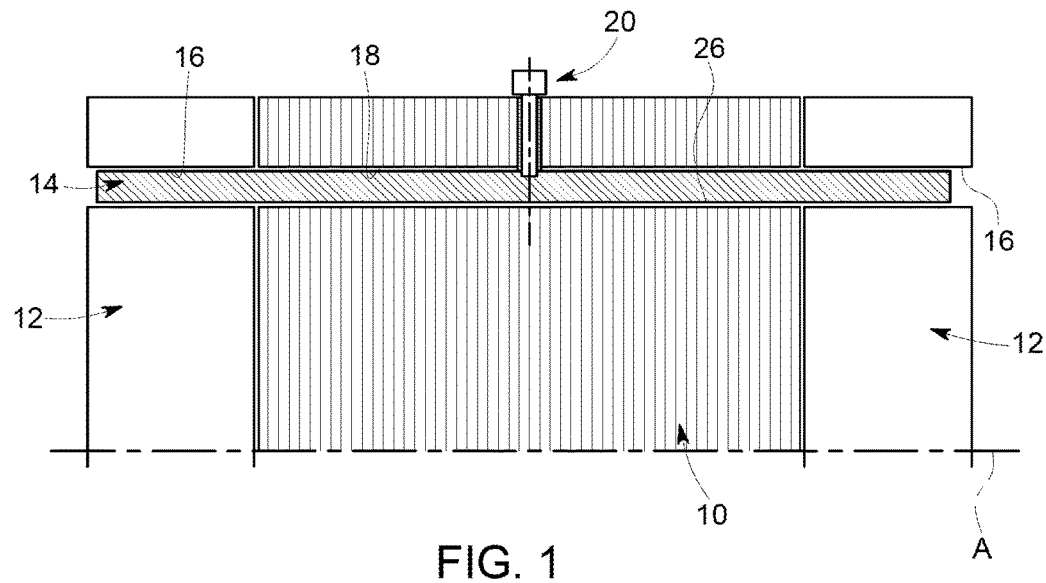
FIG. 1 shows a longitudinal half-section of a rotor.

FIG. 1 shows a longitudinal half-section of a rotor according to first embodiment, as well as its axis A of rotation.

The rotor thus shown is able to cooperate with a stator and shafts (not shown in FIG. 1).

The rotor comprises a magnetic mass 10 surrounded on both sides by short-circuit rings 12.

The magnetic mass 10 results from the assembly of magnetic sheets whose realization, particularly the means of clamping of said sheets between them, is particularly described in the patent document U.S. Pat. No. 5,512,792.

The rotor comprises several electrical conductors able to conduct, through the magnetic body 10, electric current applied to the rotor by the short-circuit rings 12.

Each electrical conductor is formed of one single bar 14.

In embodiments, the section of each bar 14 is constant or substantially constant over its entire length.

In embodiments, the section of each bar is of trapezoidal shape. More precisely, the section of each bar 14 is an isosceles trapezium having a small base and a large base.

In embodiments, the bars 14 are formed of a single material, e.g., they may be made of copper or copper alloy.

The short-circuit rings 12 as well as the bars 14 form the squirrel cage of the rotor.

In embodiments, the longitudinal ends of each bar 14 are freely placed in the orifices 16 arranged at the periphery of the short-circuit rings 12.

Each orifice 16 has a section whose shape is complementary to that of the section of the bar 14 that it accommodates, but with slightly larger inner dimensions so that there exists a tolerance clearance. This particularly allows free expansion of the end of the bar 14 in the orifice 16. The orifices 16 can be formed by milling or broaching of the short-circuit ring 12.

To cross the magnetic mass 10, each bar 14 is received inside a notch 18 arranged in the magnetic mass.

Figure 2:
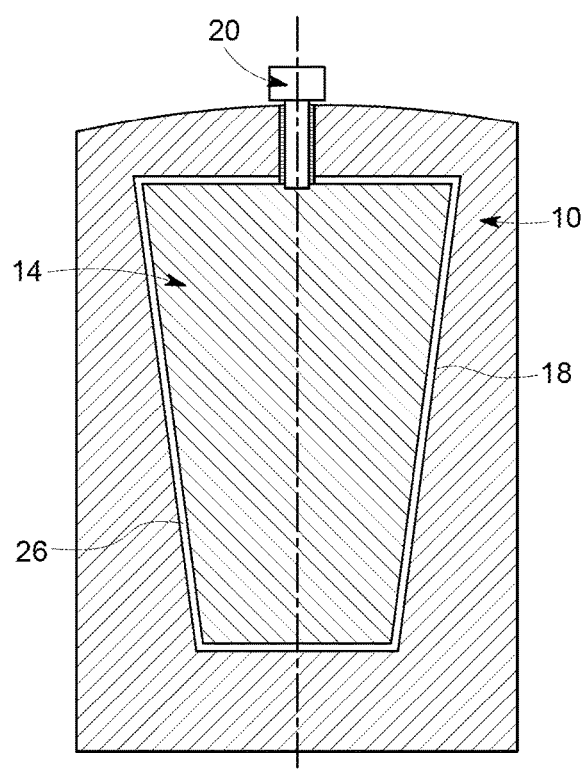
FIG. 2 shows an enlarged view of a cross section of the rotor in FIG. 1 adjacent to a notch.

Each orifice 18 has a section whose shape is complementary to that of the section of the bar 14 that it accommodates, but with slightly larger inner dimensions so that there exists a tolerance clearance. This tolerance clearance, referenced by the digit 26 in FIG. 2, ensures free expansion of the bar 14 in the notch 18 of the magnetic mass 10.

The bars 14 are fastened to the magnetic mass 10 at a single point using any suitable means of fastening 20, like for example a screw, a pin, or by any device, method and accessory of fastening, thus allowing balanced distribution of the longitudinal thermal expansion for relative displacements substantially equal between the ends of the bar 14 and the short-circuit rings 12.

Figure 3:
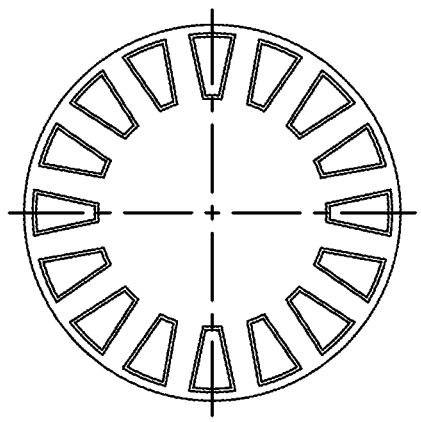
FIG. 3 shows a cross section of first embodiment of the rotor at the magnetic mass thereof; and, FIG. 4 shows a cross section of second embodiment of the rotor at the magnetic mass thereof.

As illustrated in FIG. 3, in first embodiment, each bar 14 is placed so that its large base is directed radially outwards relative to the axis A of rotation of the rotor. The notches 18 and the orifices 16 have a suitable trapezoidal shape.

Thus when the rotor is in rotation, it is the large base of the bar 14 which, under the effect of centrifugal force, increases its support on the notch 18 and the orifices 16.

In embodiments, the transversal dimensions of the bar 14 are chosen so that the distance between one side of a bar and the side located vis-à-vis the adjacent bar is substantially constant. In other words, one side of a bar and the side located vis-à-vis the adjacent bar are parallel to each other, which enables to increase the section of bars 14 for the same magnetic mass 10, thus to allow power increase of the motor having such a rotor.

Figure 4:
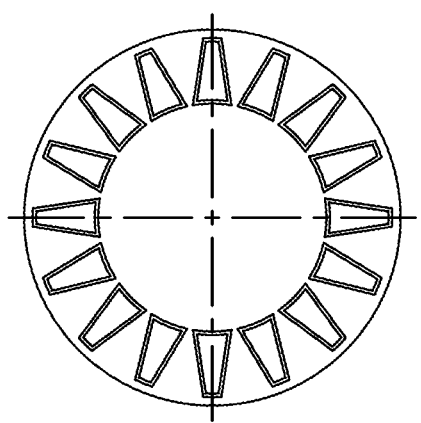

FIG. 4 shows a second embodiment in which each bar 14 is placed so that its small base is directed radially outwards relative to axis A of rotation of the rotor. The notches 18 and the orifices 16 have a suitable trapezoidal shape.

However, in the second embodiment, the bearing surface of the bar 14 on the notch 18 is smaller than in the first embodiment, and the stresses at contact points are larger and there is a risk of reducing the life duration of the magnetic mass.

Moreover, the distance between two successive bars not being substantially constant, unwanted and difficult to control magnetic effects are generated, as saturation of magnetic flux lines and excessive induction in the magnetic sheets of the magnetic mass 10, particularly at the large base.

Thus, when the rotor is rotating, it is the small base of the bar 14 which, under the effect of centrifugal force, increases its support on the notch 18 and the orifices 16. Alternatively, the four corners of the trapezoidal section are provided with a round, of substantially equal value for the corners of the large base and another substantially equal value for the corners of the small base. This enables a reduction in the concentration of mechanical stress in the magnetic sheets of the magnetic mass 10 and in the short-circuit rings 12. This thereby reduces the risk of magnetic saturation in the sheets of the magnetic mass 10 around the bars 14. Typically, at least the large base, respectively the small base of the bar 14 has two rounded corners whose rounding radius is between 10% and 50% of the length of the large base and the small base respectively. The choice of the rounding radius value is a compromise between the reduction of mechanical stresses, for example in the sheets of the magnetic mass 10, and reduction of the section of bars 14 used for the passage of electric current.

Embodiments of the present invention are particularly suitable for high power motors moving at high rotation speed, typically at peripheral speeds from 100 m·s.$^{-1}$. This type of motor is usually controlled by frequency converters. Starting of the motor requires only a weak electric current due to applications for which these types of motors are intended, namely their use in compressors or pumps.

In this case, slight pressure of the bar 14 in the orifice 16 is sufficient to allow passage of a weak current. Moreover, for the same reasons, the section of the bar 14 alone ensures the passage of weak electric current at startup. When the motor increases its speed, the centrifugal force becomes increasingly large, the latter deforms the bar 14, which will then exert pressure on an internal side of the orifice 16 in the short-circuit rings 12 and thus generate a largest contact allowing passage of a stronger electric current in the bars 14 towards the short-circuit rings 12.

The experts will understand the benefit of having bars 14 manufactured from one piece, and particularly from a single piece with trapezoidal-shaped section, enabling to increase the section of bars 14 along their entire length including in the orifices 16 of the short-circuit rings 12. This enables an increase in the power of an electric motor for a given size having such a rotor, without the drawbacks of thermal unbalance following differential thermal expansions in the bars made of at least two parts, or sparking between the parts forming the substantially trapezoidal section bar if they are not with the same electrical potential. The techniques for current flow between bars and short circuit rings having changed, one can understand the benefit of also have a substantially trapezoidal section in the ends of the bars 14 by passage of stronger electric current in the short-circuit rings 12, thereby increasing the electrical power of such a rotor.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor for an electric motor comprising:
along a rotor axis, a magnetic mass surrounded on both sides by short-circuit rings, and crossed at plural notches by electrical conductors connecting the short-circuit rings to form a squirrel cage, wherein each electrical conductor comprises a single bar having a small base, a large base, and a trapezoidal section over its entire length;
wherein the ends of each bar are freely placed in respective orifices opened at a periphery of the short-circuit rings, each orifice having inner dimensions greater than those of the bar that it accommodates, so as to leave a tolerance clearance allowing free expansion of the end of said bar in the orifice.

2. A rotor according to claim 1, wherein the trapezoidal section of each bar forms an isosceles trapezium.

3. A rotor according to claim 2, wherein the respective small base or the large base of each bar is placed radially outwards relative to the rotor axis.

4. A rotor according to claim 1, wherein at least one of the large base or the small base of each bar has two rounded corners whose rounding radius is between 10% and 50% of the length of the large base and the small base respectively.

5. A rotor according to claim 1, wherein each notch in the magnetic mass has inner dimensions greater than those of the bar that it accommodates, so as to leave tolerance clearance allowing free expansion of said bar in the notch.

6. A rotor according to claim 1, wherein each bar is from a single piece and is made of copper or copper alloy.

7. A rotor according to claim 1, wherein the section of each bar is substantially constant along the rotor axis.

8. A motor configured to drive the rotor according to claim 1 at a peripheral speed greater than or equal to 100 m·s.$^{-1}$ at the outer diameter of the magnetic mass.

9. The use of the rotor according to claim 1, in a motor configured to drive said rotor at a peripheral speed greater than or equal to 100 m·s.$^{-1}$ at the outer diameter of the magnetic mass.

* * * * *